Feb. 3, 1948. H. L. KRAEFT ET AL 2,435,448
METHOD OF MANUFACTURING TUBULAR FRAME STRUCTURES
Filed Dec. 6, 1943 3 Sheets-Sheet 1
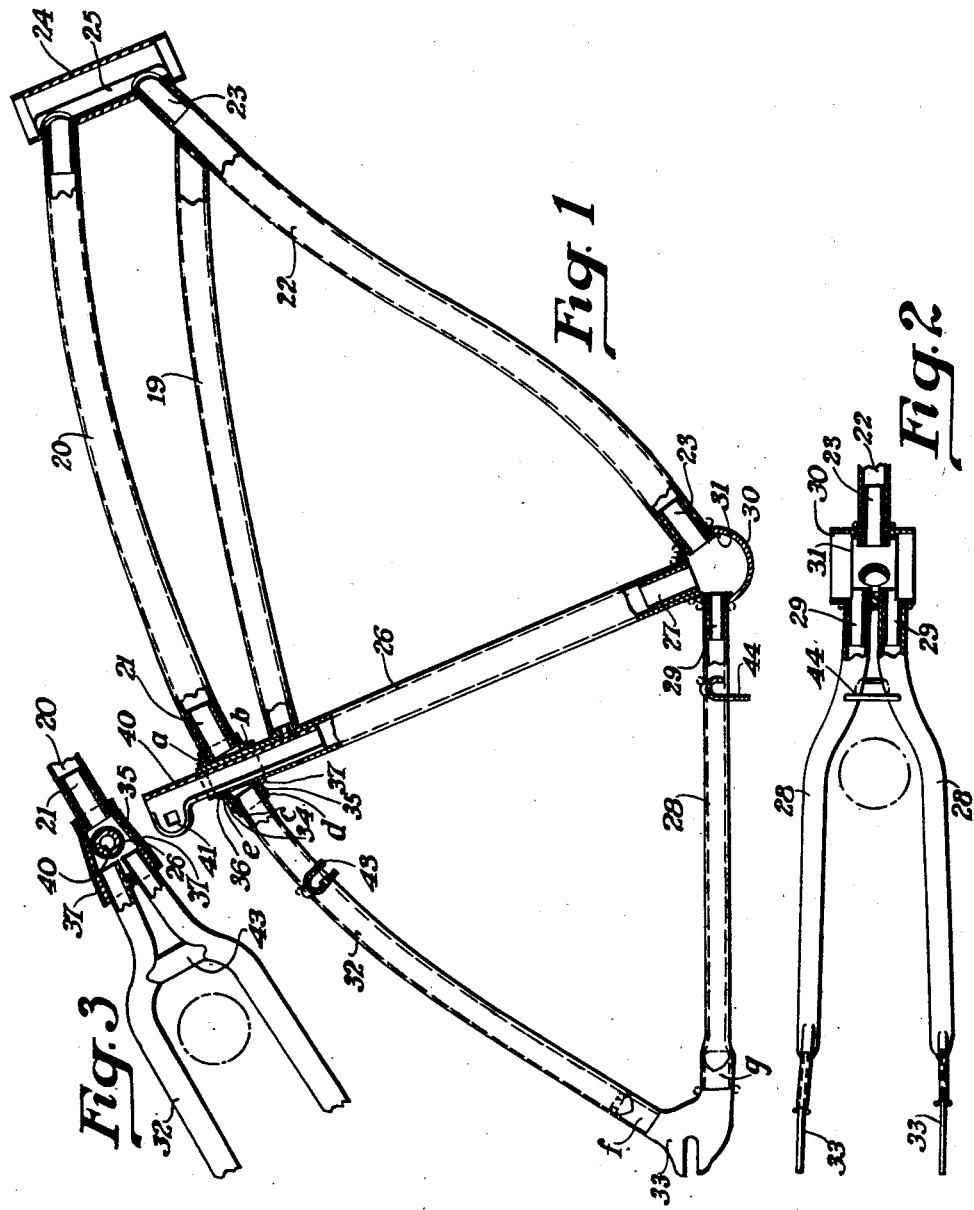
INVENTORS.
HERMAN L. KRAEFT &
LEONARD J. WALTERS.
BY Fay, Gadrick, Chilton & Isler.
Attorneys.

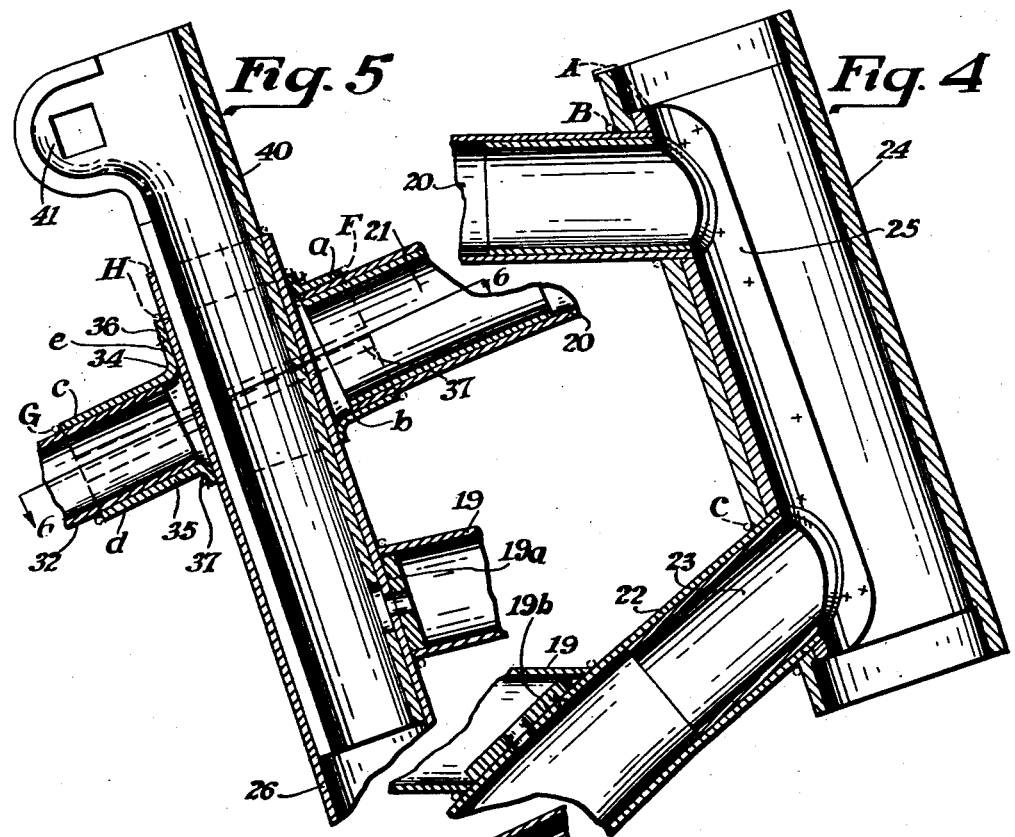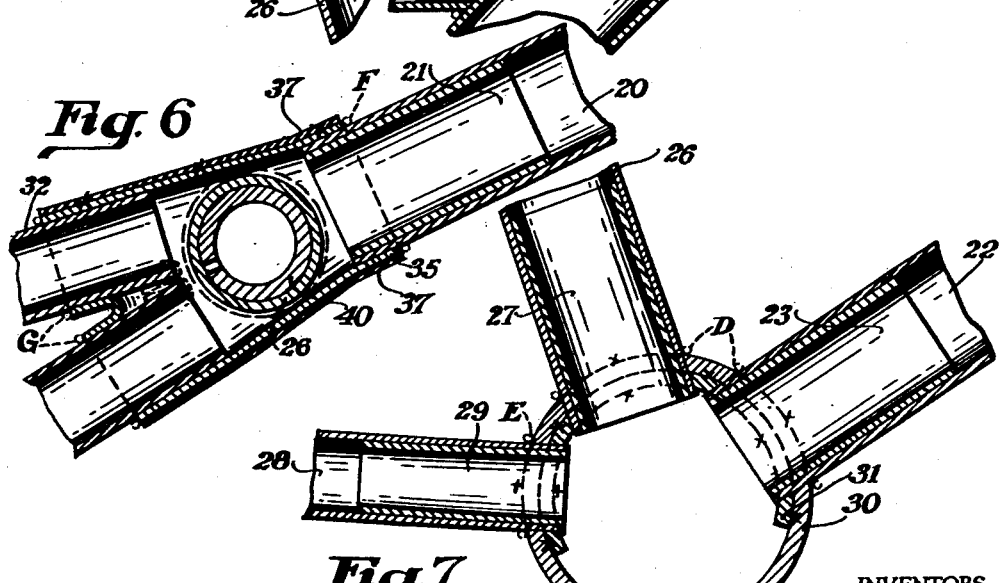

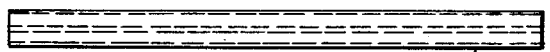
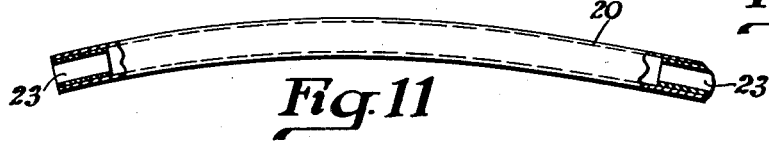
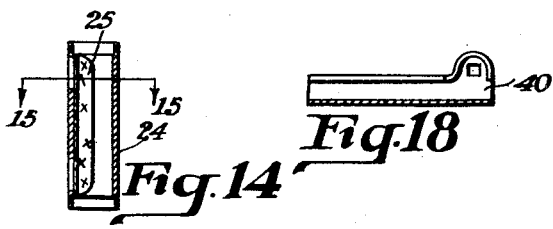
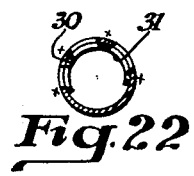
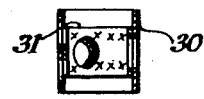
INVENTORS.
HERMAN L. KRAEFT &
LEONARD J. WALTERS
BY Fay, Gibrick, Chilton & Isler.
attorneys.

Patented Feb. 3, 1948

2,435,448

UNITED STATES PATENT OFFICE 2,435,448

METHOD OF MANUFACTURING TUBULAR FRAME STRUCTURES

Herman L. Kraeft, Cleveland Heights, and Leonard J. Walters, Shaker Heights, Ohio, assignors to The Murray-Ohio Manufacturing Company, Cleveland, Ohio, a corporation of Ohio Application December 6, 1943, Serial No. 513,163

5 Claims. (Cl. 29—176)

The general object of the present invention is to provide a method of constructing, assembling and brazing tubular frame structures whereby the serious item of cleaning costs hereto involved in the manufacture of brazed frame structures can be practically eliminated.

A further object of the present invention is the provision of a novel method of manufacturing brazed bicycle frames whereby complete tubular symmetry of the members at the joints can be obtained without necessitating grinding, polishing and other labor consuming cleaning operations about the clusters and whereby all the frame parts during and after brazing will remain clean to the extent of being metal bright.

Another object of the present invention is the provision of a novel concealed joining structure for brazed tubular frames having reinforcing characteristics imparted by members interiorly disposed whereby the brazing of the joints confines the troublesome braze spill within the structure.

A further object of the present invention is to provide a particular jointure structure for the head and hanger clusters and a seat post cluster structure in a bicycle frame construction thereby to obtain the rapid and accurate preassembly of the tubes or bars and clusters of the entire frame and in such manner that the brazing of all of the tubular connections can be effected simultaneously in a non-oxidizing brazing furnace.

The present disclosure is that of tubular bicycle frame structures and methods of manufacturing the same, although the invention as disclosed is utilizable in the manufacture of tubular structures for various purposes where symmetry and neatness in appearance is desirable.

One of the primary purposes of the present invention is to produce a brazed tubular frame structure of transversely extending tubular members of different diameters, and particularly a bicycle frame by a simultaneous brazing operation of all of the clusters or joints of the various types which go to make up such a frame. We have devised particular cluster structures, the use of which will result in a sturdy tubular frame of reasonably light weight and the manufacture of which can be brought about through the use of closely fitting metal-bright tubing and other metal-bright parts, the physical arrangement being such that the entire pre-assembly of the parts can be obtained in an economical manner. The designs of the joints or tube connections are such that a subsequent permanent joining of all of the parts comprising the frame structure can be simultaneously effected by a brazing operation in a non-oxidizing heat environment to thereby produce a completely brazed frame structure which will require substantially no cleaning operations, such as wire brushing, grinding, etc.

To the accomplishment of the foregoing and related ends, said invention, then, consists of the methods hereinafter described and particularly pointed out in the claims; the annexed drawings and the following description setting forth in detail certain means and one mode, constituting, however, but one of various applications of the principles of our invention.

In said annexed drawings:

Fig. 1 is an elevational view of a bicycle frame produced by methods of our invention with the seat post, head structure and hanger housing structure shown in cross-section;

Fig. 2 is a bottom view of the bicycle frame structure shown in Fig. 1;

Fig. 3 is a top view of the seat post region of the frame structure shown in Fig. 1;

Fig. 4 is an enlarged cross-sectional elevation of the fork bearing housing;

Fig. 5 is a similar view taken through the seat post cluster;

Fig. 6 is a cross-sectional view taken through the seat post cluster structure substantially along the line 6—6 of Fig. 5;

Fig. 7 is an elevational cross-sectional view of the hanger housing structure;

Figs. 8 to 13 illustrate various steps in the preforming of the tubular reach bars and reach bar inserts comprising the bicycle frame shown in Fig. 1;

Figs. 14 and 15 are cross-sectional views of the tubing structure comprising the fork bearing housing;

Figs. 16 and 17 are two views of the rear axle yoke plates which form the rear end of the frame structure;

Fig. 18 is a cross-sectional view of a stamped seat post structure;

Figs. 19 to 21, inclusive, are views of stamped or formed members comprising part of the seat post cluster structure; and Figs. 22 and 23 are detailed views in cross-section of the reinforcing tubing member comprising part of the hanger housing structure.

In the drawings a bicycle frame is disclosed as comprising essentially a top reach bar 20, a lower reach bar 22, a head tube or front bearing housing 24, a seat post reach bar 26, a pair of rear lower fork tubes 28, a hanger housing tube 30 and a pair of upper rear fork tubes 32, all of which are to be found in any conventional bicycle frame structure. The upper fork members 32 and the lower rear fork members 28 are joined at the rear of the frame structure by plate members 33.

A second upper reach bar 19 is shown in the drawings which may or may not be incorporated in the frame structure as desired.

The tubing comprising the foregoing stated bars is formed from cold rolled sheet steel stock into tubular shape as, for example like tubes 26 shown in Figs. 8 and 9 with a longitudinally open seam 26ª. This seam is then closed with a gas welding operation and the resulting weld 26ᵇ is smooth on the outside but has a bead 26ᶜ disposed on the inside.

We have devised a thickened jointure structure between the head tube 24 and the upper and lower reach bars 20 and 22, which jointure or connection structure is also generally followed in connecting the seat post reach bar 26, lower reach bar 22 and lower fork members 28 to the hanger housing 30. This jointure procedure comprises the formation of an insert plate 31 to be placed within the hanger housing 30 comprising a cold rolled or bright-metal stamping of a thickness substantially equal to the gauge of the stock forming the tubular members 24 and 30. Plate 31 when blanked out is also perforated to provide the required openings. These close fitting plates are provided for the purpose of doubling approximately the bearing area of the respective reach bars with the head and hanger housings when these reach bars are assembled or closely fitted into the openings formed in the walls of the tubular members 24 and 30. These smooth surfaced inserts 31 are stamped to conform fairly accurately with the curvaure of the smooth inner surface of the tubular members 24 and 30 respectively, and are temporarily attached thereto, preferably by spot welding, so controlled as to not mar the outer appearance of the tubular members 24 and 30. After the inserts are in place the housing openings are reamed or otherwise accurately produced to conform closely to the diameters of the various reach bars so that when the ends of the reach bars are inserted therein a substantially close fit is obtained between the housing tubes and inserts and the circumferential surfaces of the inserted ends of the reach bars. The spot welds are indicated by x's, there being three about each hole and three or four near the sides of the plate.

We prefer to reinforce all of the ends of the aforementioned reach bars with the exception of the upper rear fork members 32 and this is accomplished by insert members 21 in the top reach bar 20, inserts 23 in the rear ends of lower reach member 22, inserts 27 in the lower end of reach bar 26 and inserts 29 in the hanger housing ends of lower rear tubular fork members 28.

These inserts are in the nature of incomplete tubular sections formed of cold rolled steel or clean metal to closely fit within the ends of the several tubes with the slot thereof extending in parallelism or spanning the inner weld seam head of the tubes. The ends over-extend the inner surface of the plate and serve as spot weld perches. These inner ends are cut off by boring or reaming after the brazing operation. The pre-assembly spot welds are indicated by x's.

The seat post cluster structure is of such physical character as to comprise a pre-assembly lock for the final closure or tying step of securing all of the remaining loose ends of the tubes together in a precisely sturdy and simple manner. This cluster comprises an upper smooth stamping 34 and a similar lower stamping 35 formed of cold rolled steel. The upper member 34 has an upwardly extending neck or tubular section 36 formed therein and the lower member 35 has a similar neck 27 formed therein, both of which, when the two stamped members 34 and 35 are brought together in the final assembly steps, form a close tubular engagement with the upper region of the seat post reach bar 26. The rear parts of the stamped members 34 and 35 have two semi-circular parts in the form of a V for engagement with the upper ends of the rear pair of fork members 32. The forward ends of the members 34 and 35 are semi-circular and of such dimension as to closely embrace the rear end of the upper reach bar 20. Also, the juxtaposed edges of these two members may be machined or otherwise properly fitted so as to not mar the ultimate appearance of the frame. Finishing strips 37 may overlap these seams and may be spot welded preliminarily to one of the members 34—35.

After the various reach bars have been brought into assembled relation with the head housing or tube 24 and its insert 25 and/or with the hanger housing 30 and its insert 31, the locking together of the assembly can then be effected by bringing together the two stamped seat post cluster members 34 and 35 in embracing relation to ends of the tubes 21, 26 and tubes 32, whereupon light spot welds about surfaces a, b, c, d and e will serve to temporarily maintain all of the tubing in a substantially accurate pre-assembled relation to each other.

These spot welds may be effected in the well known manner of having both the positive and negative electrodes disposed exteriorly of the cluster structure and the electrodes need not be in alignment. The spot welds thus effected will be of sufficient strength to maintain the pre-assembly temporarily.

If desired, a seat post sleeve and clamp 40 of such from as to closely fit within the upper end of the seat post reach bar 26 may be inserted therein. In the form shown this sleeve member 40 comprises a stamping affording a post clamping connection with bolt lands 44 for contracting the upper part of the sleeve upon a seat post. The tubular part of the sleeve 40 is split or formed incomplete whereby the split may span, or extend parallel to the weld bead 26ᶜ within the tube 26.

We prefer to effect a pre-assembly of the lower fork tube 28 and upper fork tube 32 and the rear yoke plates 33 before attachment of the lower rear fork tubes 28 to the hanger housing 30 and this assembly may be held together by light spot welds at f and g. It will be apparent that this order of assembly may vary.

In order to avoid or reduce to a minimum the spillage, running and dripping of the brazing metal we propose to copper plate to the desired extent the tubular inserts 21, 23, 27 and 29 before the same have been inserted within the ends of the respective reach bars. If desired, thin copper shims of the proper thickness may be applied to the inserts in lieu of the copper coating, but in either case practical dimensional allowance should be made in the diameter of the inserted members.

To complete the conditioning of the pre-assembly for the brazing operation, sections of commercially pure copper wire of substantially predetermined volume to maintain the spillage low are then disposed at the points A, B, C, D, E, F, G and H and the frame is maintained in such position and the copper pieces are of such shape that the copper pieces are retained in place and visibly disposed while the entire pre-assembly is passed through a brazing furnace and in a non-oxidizing environment, during which the entire frame is subjected to a brazing temperature of from 2025° F. to 2080° F. At this temperature range the solid copper pieces will be melted to such a fluid state that the copper will flow by capillary attraction between the interconnecting surfaces of all of the tubular members and the inserts. Such overflow or spillage as may take place will be distributed in a very thin, smooth layer of copper coating on the tubing surfaces which will not be perceptible after the frame is decorated. The frame thereafter is passed through a non-oxidizing cooling environment until the temperature thereof is reduced to such point that the copper has solidified and the outer smooth surfaces of the frame will not become oxidized.

The frame thus produced may then be placed in a straightening gauge or fixture to correct any slight distortions which might have taken place in the various tubular members now comprising the unitary frame. Cross struts in the form of stamped members 43 and 44 may then be placed tightly between the converging portions of the upper and lower rear fork members 32 and 28 respectively, and held there if desired by a spot weld.

We are aware of the prior practice of pre-assembling of certain of the tubular members by the use of spot welds to maintain pre-assembly of certain of the parts for a subsequent dip brazing process to braze these certain parts together. We are also aware of the use of butt welding methods to bring together cluster assemblies of tubular members in bicycle frames, all of which incurred the expenditure of considerable labor by grinding, filing, wire cleaning, etc., to remove the surplus brazing metal before the decoration of the frame could be effected. These cleaning operations and costs, particularly in regions difficultly accessible for such cleaning operations have always been a considerable item in the manufacture of decorated tubular frames.

By our disclosed structure and method of pre-assembly for brazing, a sturdy light-weight tubular frame structure is obtainable, the juncture regions of the tubing are clean and symmetrical in appearance since outer weight adding socket structures are avoided and the entire frame structure when thus produced is ready for final decoration, that is, lacquering or enameling, since the entire outer surfaces of the frame remain metal bright and no scaling of the tubular surface is incurred.

The foregoing description of the assembly steps made no reference to the specific manner of including the secondary top reach bar 19 since in some bicycle frame structures the same is omitted. However, this bar can be included in the structure in a manner not in conflict with the entire procedure set forth herein and as follows. Buttons or disks 19a and 19b may be stamped or otherwise formed to accurately fit the outer surfaces of tubes 26 and 22 respectively and be attached thereto by a spot weld. The disks have a central aperture formed therein which register with apertures formed in the walls of the tubes 26 and 22 for ventilating and braze flow purposes during brazing. The seat post member 40 also has an aperture formed therein at the proper location to register with the opening in disk 19a. The perimeters of these disks are such as to form close fits with the inner end surfaces of the ends of tube 19. Thus tube 19 may first be fitted to disk 19a and then swing down to bring the other end of the tube into snap engagement with the lower edge of disk 19b. Copper wires are externally applied when the tube 19 is being assembled.

It will be apparent that the tubular joint structure and the manner of brazing is useful in the manufacture of tubular structures other than bicycle frames where comparatively light weight and sturdiness, coupled with appearance, are desired.

Other forms may be employed embodying the features of our invention instead of the one here explained, change being made in the form or construction, provided the elements stated by any of the following claims or the equivalent of such stated elements be employed whether produced by our preferred method or by others embodying steps equivalent to those stated in the following claims.

We therefore particularly point out and distinctly claim as our invention:

1. The method of manufacturing tubular velocipede frame structures formed of tubes of various diameters comprising effecting a substantially precise assembly of the joining surfaces of the tubular members by reinforcing the walls of certain of the larger diameter members with complementarily formed metallic inserts to provide a substantially double wall structure, forming precise separated openings in such thickened walls by a reaming operation to afford close fitting reception and an increased bearing area for the ends of the smaller diameter tubular members, reinforcing said last mentioned tubular members by tubular inserts, inserting the ends of the smaller diameter members into said precisely formed openings whereby the inserted ends extend into the interior of the larger diameter tubes, temporarily fixing said extending ends to the large diameter inserts producing simultaneously a localized brazing of all of the joints of the assembly by the use of commercially pure copper in a non-oxidizing brazing furnace, during which operation the entire assembly and copper are subjected to such temperature that the copper will become sufficiently fluidic to flow by gravity and by capillary attraction between the surfaces of the interfitting parts of the tubular members, thickened walls and maintaining the assembly in said position during a sufficient non-oxidizing cooling period to permit the copper to solidify and finally cutting away the extensions of the smaller tubes.

2. The method of manufacturing tubular velocipede frame structures comprising effecting a substantially precise assembly of the joining surfaces of the tubular members by reinforcing the walls of certain tubular members having a larger diameter with closely fitting metallic inserts which substantially double the wall thickness, forming separated transversely extending bores in said double walled part of the tubular members and the bores being of substantially the same diameter as the end diameters of other tubular members of smaller diameter whereby a circular bore having a bearing area substantially twice the thickness of the larger tube is provided, providing said last mentioned members with tubular reinforcing inserts, close fitting the tubular members one to another by inserting the smaller diameter ends of said members temporarily fixing said inserted ends within the interior of the larger tube into the bores formed in the other members, fixing the thus assembled members with spot welds or the like, producing simultaneously a localized brazing of the joints of the assembly by disposing unfused copper at each joint region and so positioning the assembled frame within a brazing furnace that each of the copper pieces is maintained at its desired locus relative to the surfaces to be joined, subjecting the entire assembly and the copper pieces to a non-oxidizing temperature sufficiently high to cause the copper to flow by gravity and by capillary attraction between the surfaces of the interfitting parts of the tubular members, maintaining the assembly in said position during a sufficient cooling period in a non-oxidizing environment to permit the copper to solidify and finally cutting away the ends of the smaller tubes which are disposed within the interiors of the larger tubes.

3. The method of manufacturing tubular bicycle frames with concealed head and hanger housing joints comprising effecting a substantially precision assembly of the tubular members of the assembly by applying inserts to the tubular regions of the head and hanger housings which are to be interfitted to the tubular frame bars, providing said frame bars with tubular end-reinforcing inserts, fitting the reach bars to the head and hanger housings and the inserts therein by precision finishing openings in the said housings and inserts head and hanger housings which are independent of each other, inserting the reinforced reach bar ends in the finished opening to over extend the inner side of the double wall completing the assembly by attaching the seat post cluster and rear upper frame parts, fixing the said various tubular members one to another with spot welds or the like and by then producing simultaneously a localized brazing of the joints of the assembly by applying unfused pieces of brazing metal to each joint region and by so positioning the assembled frame within a non-oxidizing brazing furnace that the brazing metal pieces are maintained in desired loci, subjecting the entire assembly and the brazing metal pieces to a temperature at which the brazing metal will be so fluidic as to flow between the surfaces of the interfitting parts of the tubular members and inserts, maintaining the assembly in said position during a sufficient cooling period to permit the brazing metal to solidify and thereafter cutting away or removing the surplus tube ends extending into the interior of the larger tube.

4. The method of effecting a substantially precise assembly of the tubular members of a bicycle frame for simultaneous brazing of all of the parts thereof comprising forming double walled tubular head and tubular hanger housing structures with separated openings extending through the double walls thereof for the reception of the ends of reach bars comprising part of the frame thereby to provide increased cylindrical bearing areas for the circumferential surfaces of smaller tube ends to be fitted therein, reaming or otherwise precisely finishing the surfaces of the openings to conform in close fitting relation to the outside diameter of the reach bar ends to be fitted therein, forming a double wall structure at the end regions of the reach bars by inserting tubular sections within the end portions of the reach bars in close fitting relation to the internal diameters of the reach bars to stiffen the reach bar ends during a subsequent relatively high heating period and to strengthen the ultimate joint, effecting a complete assembly of all of the elements comprising the frame including the inserting and fixing of the double walled ends of the reach bars in the precise openings formed in the double walled tubular head and the double walled tubular hanger housing, and effecting a simultaneous copper brazing of all of the interconnecting elements of the joints of the frame in a non-oxidizing brazing furnace by submitting the entire frame assembly to copper brazing temperature for the required period.

5. A method of effecting a substantially precise assembly of the tubular members of a bicycle frame for simultaneous brazing purposes comprising forming double walled tubular head and tubular hanger housing structures with openings extending through the double walls thereof for the bearing reception of the ends of the reach bars comprising part of the frame, reaming or otherwise precisely finishing the surfaces of the openings to conform in close fitting relation to the outside diameter of the reach bar ends to be fitted therein whereby a cylindrical bearing area of substantially twice the thickness of the head and housing tubes is provided for the reach bar ends during a subsequent simultaneous brazing operation, forming a double wall structure at the end regions of the reach bars by inserting tubular sections within the end portions of the reach bars in close fitting relation to the internal diameters of the reach bars, effecting a complete assembly of all of the elements comprising the frame including the close fitting of the double walled ends of the reach bars in the precise openings formed in the double walled tubular head and the double walled tubular hanger housing and fixing the various elements in assembled relation whereby a simultaneous copper brazing of all of the interconnecting elements of the joints of the frame in a non-oxidizing brazing furnace by submitting the entire frame assembly to a sustained copper brazing temperature.

HERMAN L. KRAEFT.
LEONARD J. WALTERS.

REFERENCES CITED

The following references are of record in the file of this patent:

UNITED STATES PATENTS

| Number | Name | Date |
|---|---|---|
| 1,501,129 | Meiselback | July 15, 1924 |
| 548,165 | Lavender | Oct. 15, 1895 |
| 649,580 | Latta | May 15, 1900 |
| 1,906,385 | Leydig | May 2, 1933 |
| 1,550,157 | Gillette | Aug. 18, 1925 |
| 2,209,572 | Lewis | July 30, 1940 |
| 595,148 | Cobb | Dec. 7, 1897 |

(Other references on following page)

| Number | Name | Date |
|---|---|---|
| 571,289 | Shultz | Nov. 10, 1896 |
| 2,160,039 | Singer | May 30, 1939 |
| 590,307 | Finley | Sept. 21, 1897 |
| 507,974 | Crosby | Oct. 31, 1893 |
| 1,914,811 | Kraeft | June 20, 1933 |
| 2,113,060 | Sandberg | Apr. 5, 1938 |
| 2,160,680 | Sandberg | May 30, 1939 |
| 2,199,423 | Taylor | May 7, 1940 |
| 2,059,822 | Steenstrup | Nov. 3, 1936 |

FOREIGN PATENTS

| Number | Country | Date |
|---|---|---|
| 15,597 | Great Britain | 1898 |
| 513,749 | Great Britain | Oct. 20, 1939 |
| 456,503 | Germany | Feb. 24, 1928 |

OTHER REFERENCES

Gen. Elec. Review, Aug. 1936, pp. 381 to 387.

Art. on "New Uses of Electric-Furnace Brazing Process." (Copy in Div. 14.)

Amer. Machinist, Nov. 13, 1940, pp. 903 to 906.

Art. on "Saving with Brazing." (Copy in Div. 14.)

Welding Hdbk., 1942 ed., Am. Weld. Soc. 33 W. 39th St., New York, pp. 561, 581, 591 to 604.